US010822088B2

(12) United States Patent
Pozzi et al.

(10) Patent No.: US 10,822,088 B2
(45) Date of Patent: Nov. 3, 2020

(54) UNIFIED PASSENGER SERVICE UNIT (PSU) CONTROL

(71) Applicant: B/E Aerospace, Inc., Winston-Salem, NC (US)

(72) Inventors: Alexander Pozzi, Winston-Salem, NC (US); Francis Xavier L. Garing, Atlanta, GA (US); Jae Hun Gu, Doraville, GA (US); Alyssa G. Mellett, Kennesaw, GA (US); Julia M. Brooks, Atlanta, GA (US); Thomas W. Cahoon, Decatur, GA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 377 days.

(21) Appl. No.: 15/977,753

(22) Filed: May 11, 2018

(65) Prior Publication Data

US 2019/0344892 A1    Nov. 14, 2019

(51) Int. Cl.
*B64D 11/00* (2006.01)
*B64D 11/06* (2006.01)
*G05G 1/10* (2006.01)

(52) U.S. Cl.
CPC .... *B64D 11/00155* (2014.12); *B64D 11/0626* (2014.12); *B64D 2011/0053* (2013.01); *G05G 1/105* (2013.01)

(58) Field of Classification Search
CPC ........ B64D 2011/0053; B64D 11/0626; B64D 11/00155; B64D 2013/0655
See application file for complete search history.

(56) References Cited

U.S. PATENT DOCUMENTS

| | | | |
|---|---|---|---|
| 9,487,296 B2 | 11/2016 | Freund et al. | |
| D784,904 S | 4/2017 | Schutterra et al. | |
| 2012/0230530 A1 | 9/2012 | Schevardo | |
| 2014/0186026 A1 | 7/2014 | Oshima et al. | |
| 2017/0203856 A1* | 7/2017 | Dunn | B64D 11/0015 |
| 2018/0136733 A1* | 5/2018 | Schalla | B64D 13/00 |
| 2019/0329889 A1* | 10/2019 | Afonso | B64D 13/00 |

FOREIGN PATENT DOCUMENTS

| | | |
|---|---|---|
| EP | 2832643 A1 | 2/2015 |
| EP | 3299293 A1 | 3/2018 |
| WO | 2005079309 A2 | 9/2005 |

OTHER PUBLICATIONS

Extended Search Report dated Oct. 1, 2019 for EP Application No. 19173737.8.

* cited by examiner

*Primary Examiner* — Jessica B Wong
(74) *Attorney, Agent, or Firm* — Suiter Swantz pc llo

(57) ABSTRACT

A unified passenger service unit (PSU) control concentrically incorporates a reading light, a gasper outlet, and a notification ring within a control knob rotatable or pushable (via a pushbutton or the control knob itself) by an occupant of the aircraft seat to which the PSU control corresponds. The notification ring may be activated by the passenger or by the cabin crew, and may be visible throughout the aircraft. The notification rings may indicate an attendant call, or be activated by the crew in groups or waves to direct passenger activity. The PSU control includes a user interface (UI) display that serves as a control interface for the gasper outlet and reading light. The UI display may also show indicators or messages sent by the cabin crew.

20 Claims, 6 Drawing Sheets

US 10,822,088 B2

UNIFIED PASSENGER SERVICE UNIT (PSU) CONTROL

BACKGROUND

Conventional passenger service units (PSU) installed in overhead panels generally provide passengers with a reading light, a gasper or fan outlet, and a call button (for requesting assistance from cabin crew) as separate elements, which can create a complicated and cluttered appearance. Furthermore, the PSU provides no way for cabin crew to communicate with passengers, apart from announcements broadcast to the cabin as a whole.

SUMMARY

In one aspect, embodiments of the inventive concepts disclosed herein are directed to unified passenger service unit (PSU) control system dedicated to an aircraft seat. The PSU control system may concentrically incorporate a reading light, a gasper outlet, and a notification ring within a control knob. The control knob may be rotated or pushed (either via an included pushbutton or via the control knob as a whole) by the passenger occupying the seat, e.g., to call an attendant or control the gasper outlet and reading light settings. The notification ring may be illuminated by the passenger (e.g., to indicate the attendant call or in response to activation) or illuminated by the cabin crew, and may be visible by cabin crew throughout the aircraft. The unified PSU control includes a user interface (UI) display capable of providing a control interface while adjusting the gasper strength or light intensity. The UI display may also display seat and row indicators or messages sent by the cabin crew.

In a further aspect, embodiments of the inventive concepts disclosed herein are directed to unified passenger service unit (PSU) control system corresponding to a group of aircraft seats (e.g., a group comprising an aisle, middle, and window seat or any other grouped unit of seats). The PSU control system comprises a group of PSU control units, each individual control unit dedicated to an individual seat of the group. Each individual PSU control unit may concentrically incorporate a reading light, a gasper outlet, and a notification ring within a control knob. The control knob may be rotated or pushed (either via an included pushbutton or via the control knob as a whole) by the passenger occupying the seat, e.g., to call an attendant or control the gasper outlet and reading light settings. The notification ring may be illuminated by the passenger (e.g., to indicate the attendant call or in response to activation) or illuminated by the cabin crew, and may be visible by cabin crew throughout the aircraft. The notification rings of each control unit of the control system may be illuminated by the cabin crew in concert or in coordination with each other (e.g., to indicate that a particular row of seats should deplane first) or in coordination with other grouped notification units throughout the aircraft (e.g., to direct passengers to the emergency exits). Each unified PSU control unit includes a user interface (UI) display capable of providing a control interface while adjusting the gasper strength or light intensity. The UI display may also display seat and row indicators or messages sent by the cabin crew.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION OF EXEMPLARY EMBODIMENTS

Figure 1:
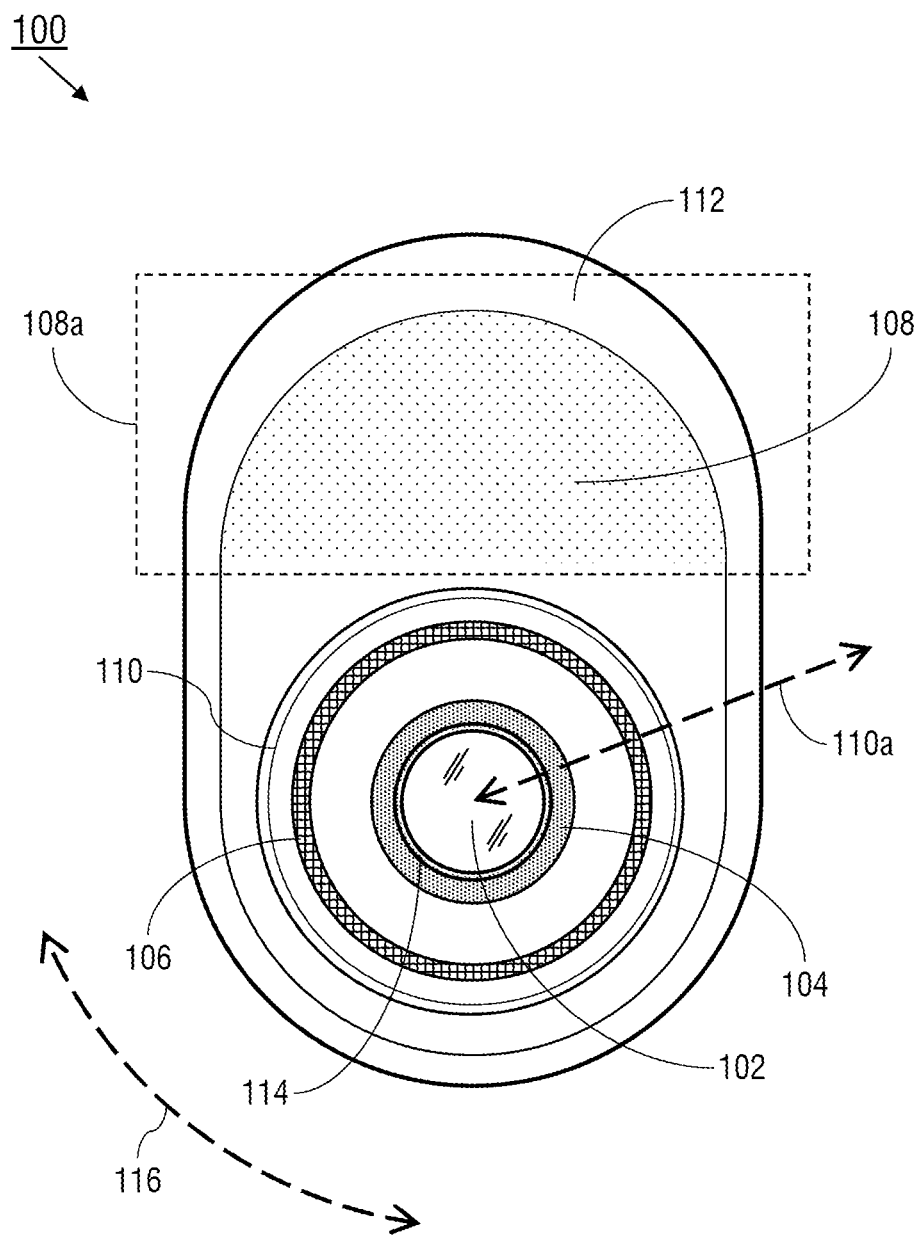
FIG. 1 illustrates an exemplary embodiment of a unified passenger service unit (PSU) controller according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1*a*, 1*b*). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a' and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a unified passenger service unit (PSU) controller mountable in an overhead panel of an aircraft cabin. The unified PSU controller combines lighting, ventilation, and call controls into a single compact unit with an intuitive interface that allows detailed communication with each individual passenger by the cabin crew.

Referring to FIG. 1, an exemplary embodiment of a unified PSU controller 100 according to the inventive concepts disclosed herein may include a reading light 102, a gasper outlet 104, a notification ring 106, and a user interface (UI) display 108. The reading light 102, gasper outlet 104, and notification ring 106 may be concentrically set into a control knob 110, arranged around a central axis (110a) of the control knob.

In some embodiments, the control knob 110 and UI display 108 may be set into a recess (112), which recess is set into a PSU panel (e.g., an overhead panel extending across a row or group of aircraft seats). A passenger or occupant of the seat corresponding to the unified PSU controller 100 (e.g., each seat may have its own dedicated PSU controller) can control the intensity of the reading light 102 and the strength of the gasper outlet 104, communicate to the cabin crew, or receive messages from the cabin crew by engaging with the control knob 110, the UI display 108, and the notification ring 106. For example, the UI display 108 may provide an interactive control interface for increasing or decreasing the reading light intensity or gasper strength.

The UI display 108 may be an LED-based or LCD-based display behind a transparent or translucent surface; the active area (108a) of the UI display may slightly exceed or overlap the recess 112 in order to maximize the display area. In some embodiments, the UI display 108 may be partially or fully touch-sensitive for additional functionality.

While the control knob 110 and recess 112 are shown respectively as round and oval in shape, the control knob and/or recess may be any appropriate or functional shape, e.g., square, polygon, rounded polygon. The control knob 110 may be partially rubberized, ridged, textured, or coated (e.g., around a circumference or perimeter) so as to create a gripping portion for facilitating smooth rotation of the control knob by a hand or finger of a passenger. It is contemplated that the control knob 110 may be oriented in the PSU panel so as to provide optimal light and ventilation for an occupant of the seat to which the unified PSU controller 100 corresponds. In some embodiments, the control knob 110 may be positionable or manipulable relative to the PSU panel for added passenger control of lighting or ventilation.

The notification ring 106 may incorporate luminous elements enabling the notification ring to illuminate in a variety of colors, to flash between lit and unlit states, or to animate a sequence of colors and patterns depending on the intended message. The reading light 102 may incorporate a center pushbutton (114) and the control knob 110 may be rotated (116), e.g., around the central axis 110a. For example, the passenger may activate a basic attendant call via the pushbutton 114 into which the reading light 102 is incorporated, causing the notification ring 106 to illuminate in a specific color or pattern. The notification ring 106 may illuminate in different colors or patterns to indicate messages or indicators sent to the passenger from the cabin crew. In some embodiments, the pushbutton 114 may be integrated into the control knob 110 as a whole rather than into the reading light 102; for example, the passenger may push the entire control knob 110 to activate an attendant call or select a control interface.

Figure 2:
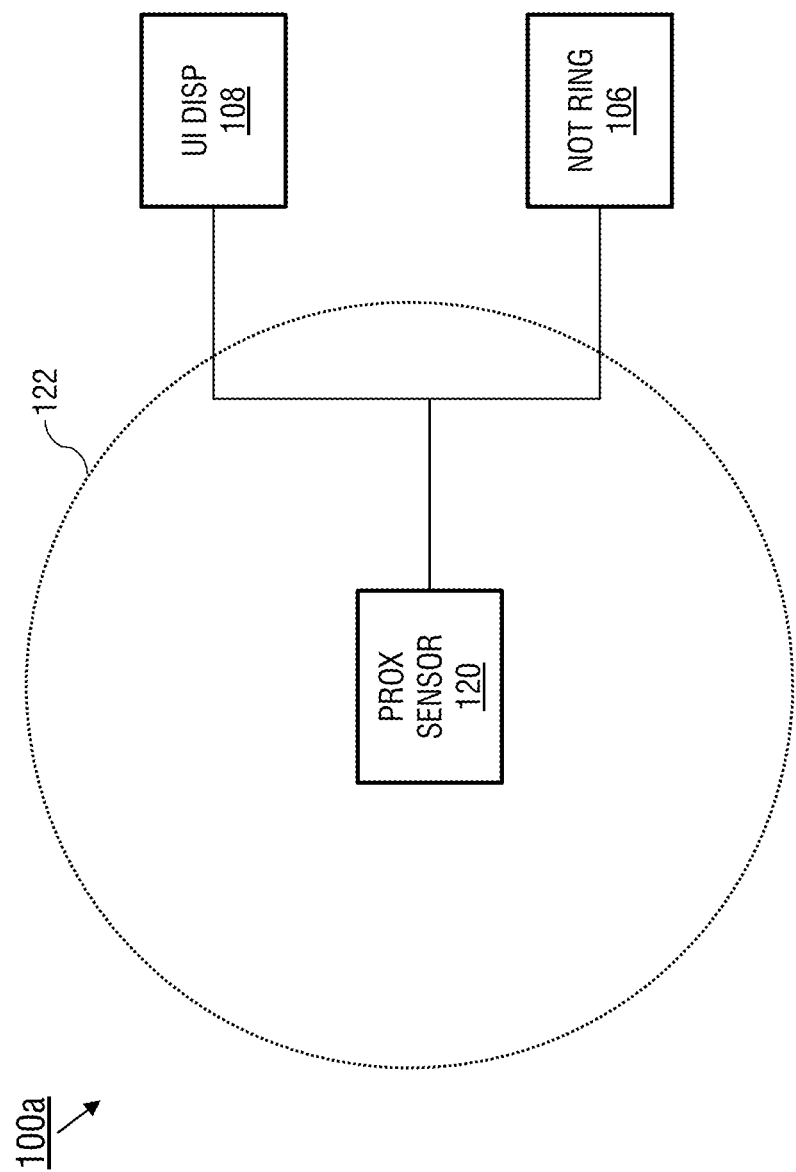
FIG. 2 illustrates a detection system of the unified PSU controller of FIG. 1.

Referring to FIG. 2, the unified PSU controller 100a may be implemented and may function similarly to the unified PSU controller 100 of FIG. 1, except that the unified PSU controller 100a may include a proximity sensor 120. The proximity sensor 120 may be an infrared (IR)-based sensor or a distance sensor capable of detecting the approach of a passenger's hand toward the unified PSU controller 100a. For example, the unified PSU controller 100a may remain in a default or "sleep" state (e.g., no messages incoming from the cabin crew) until the passenger's hand comes within a predetermined radius (122) of the unified PSU controller 100a, whereupon the UI display 108 may activate or the notification ring (106) may light up in response. The notification ring 106 may transition from an "off" to an "on" state or illuminate in such a way as to guide interaction with the unified PSU controller 100a, e.g., by animating to suggest rotation of the control knob 110 (FIG. 1) or engagement of the pushbutton 114 (FIG. 1).

Figure 3:
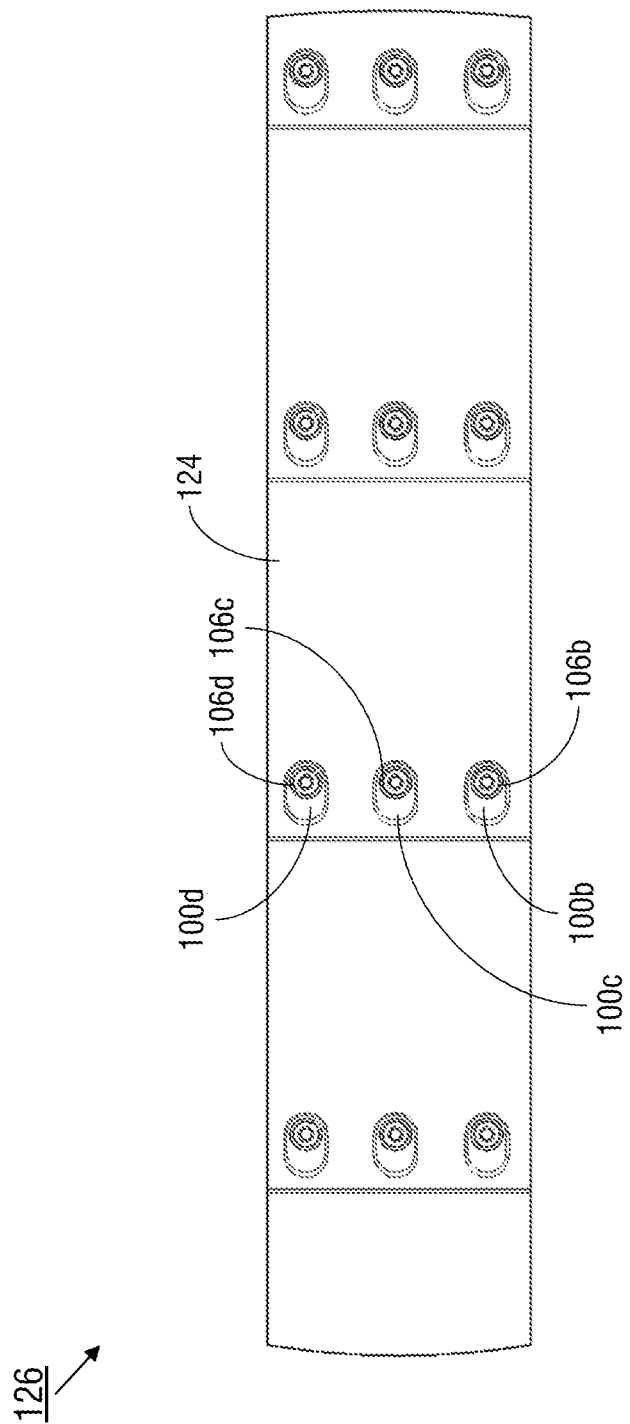
FIG. 3 is a dorsal view of a unified PSU panel incorporating the unified PSU controller of FIG. 1.

Referring to FIG. 3, the unified PSU controllers 100b-d may be implemented and may function similarly to the unified PSU controller 100a of FIG. 2, except that the unified PSU controllers 100b-d may be incorporated into a unified PSU panel (124) aboard an aircraft 126. For example, the aircraft 126 may incorporate into its overhead panel system a series of unified PSU panels 124. Each unified PSU panel 124 may correspond to a row or group of aircraft seats (e.g., between two and five seats, depending on the interior configuration of the aircraft) while each unified PSU controller 100b-d may be dedicated to a particular seat within the row or group (and to the occupant of said seat). For example, the unified PSU controllers 100b-d may respectively be dedicated to the window, middle, and aisle seats of the three-seat row served by the unified PSU panel 124, and operated by the passengers occupying each respective seat. Each of the unified PSU controllers 100b-d may be illuminated in a different color (e.g., via their respective notification rings 106b-d) depending upon their respective operational status. For example, if the cabin crew has received, acknowledged, and is in the process of responding to an attendant call submitted via the unified PSU controller 100b when the aisle-seat passenger submits a new attendant call via the unified PSU controller 100d, the notification ring 106b of the unified PSU controller 100b may be lit according to a first pattern (e.g., solid blue or yellow) while the notification ring 106d of the unified PSU controller 100d may be lit according to a second pattern (e.g., flashing blue or yellow, solid red) to indicate that the new attendant call has not yet been acknowledged. The unified PSU controllers 100b-d may be lit in unison according to the same pattern, e.g., to indicate a message or indicator sent by the cabin crew, such as a notification for passengers to take their seats or as a reminder to fasten their seatbelts, or during landing/disembarkation. For example, one or more of the passengers served by the PSU panel 124 may have an urgent connection once the aircraft 126 reaches its destination, and thus it may be determined that the passengers may deplane out of sequence (e.g., before other forward rows) so that the passengers have an optimal amount of time to arrive at their connecting flight.

Figure 4:
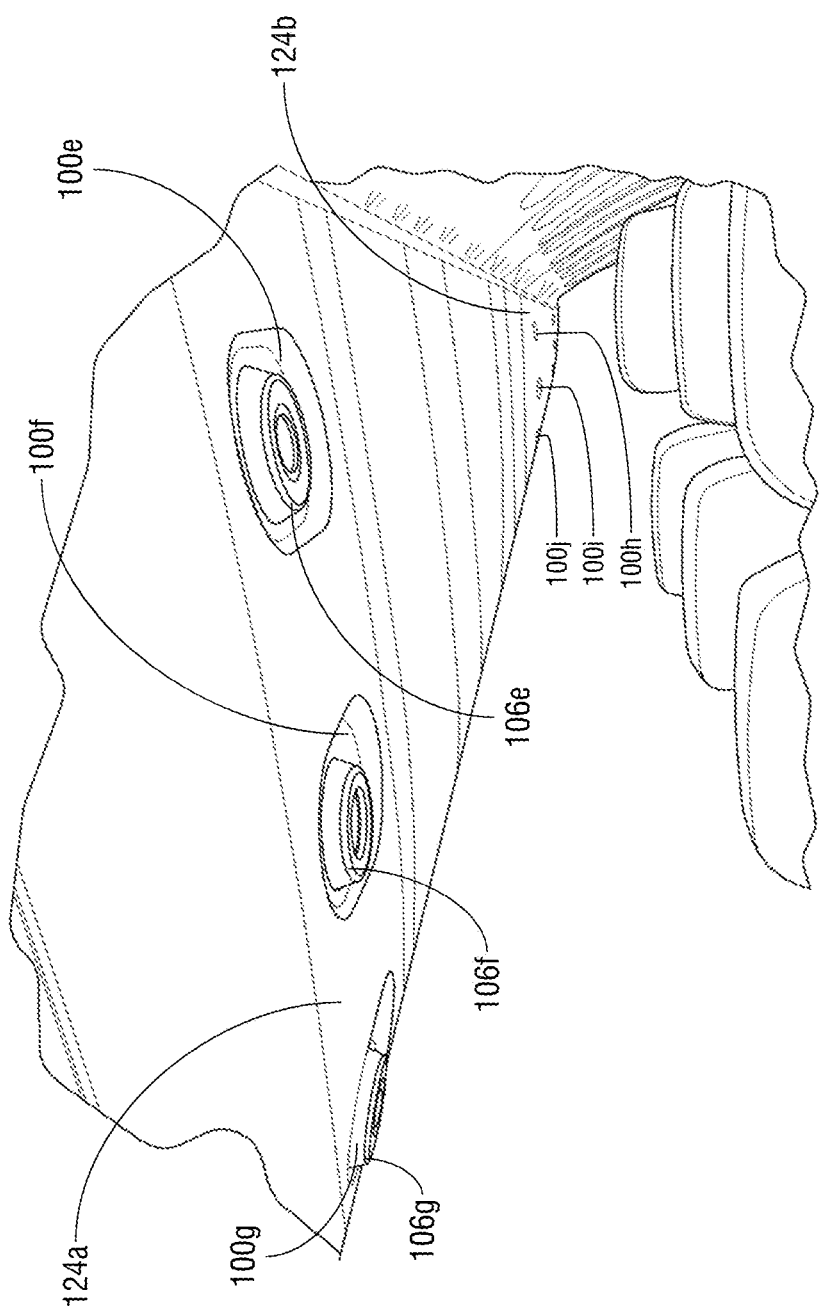
FIG. 4 is an aft dorsal view of the unified PSU panel of FIG. 3.

Referring to FIG. 4, the unified PSU panel 124a and unified PSU controllers 100e-g may be implemented and may function similarly to the unified PSU panel 124 and unified PSU controllers 100b-d of FIG. 3, except that the unified PSU controllers 100e-g may be positioned so their respective notification rings 106e-g may be seen by cabin crew, either at designated crew positions (e.g., seats where crew are stationed during taxi, takeoff and landing phases; standing positions either at the front of a cabin zone or in the aisles). Similarly, other unified PSU controllers 100h-j within other unified PSU panels (124b) in other parts of the aircraft may be visible to cabin crewmembers throughout the passenger cabin (e.g., so the crew may respond to new attendant calls regardless of where in the cabin they may be at the time). The unified PSU controllers 100e-g may be lit (e.g., due to activation by the cabin crew) in coordination with each other, as noted above, or in coordination with other groups of unified PSU controllers (100h-j) within other unified PSU panels (124b) throughout the aircraft (126, FIG. 3). For example, the unified PSU controllers 100e-g may be illuminated as a group, in coordination with other groups of unified PSU controllers (100h-j), in waves to direct passengers toward emergency exits.

Figure 5A:
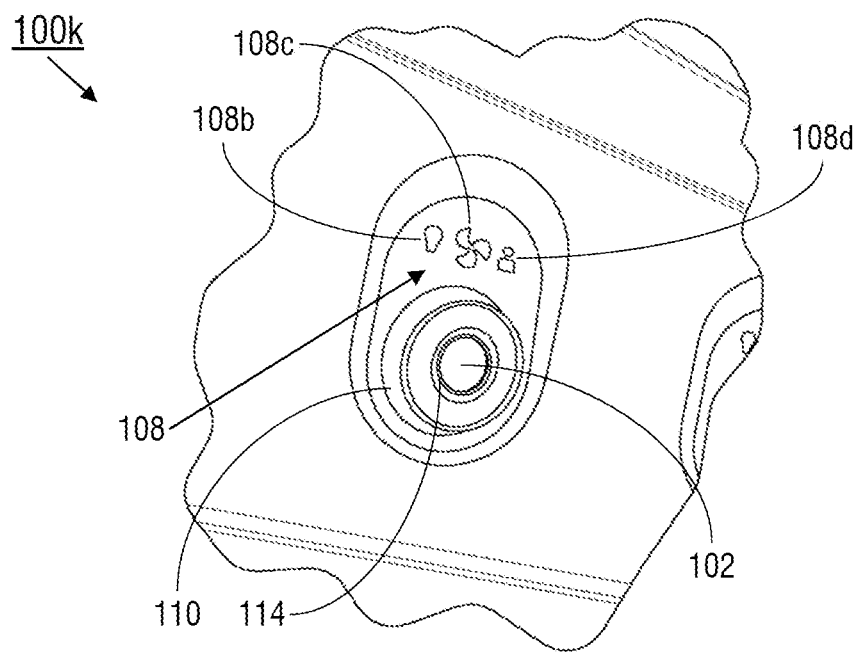
FIGS. 5A and 5B illustrate operations of the unified PSU controller of FIG. 1.
Figure 5B:
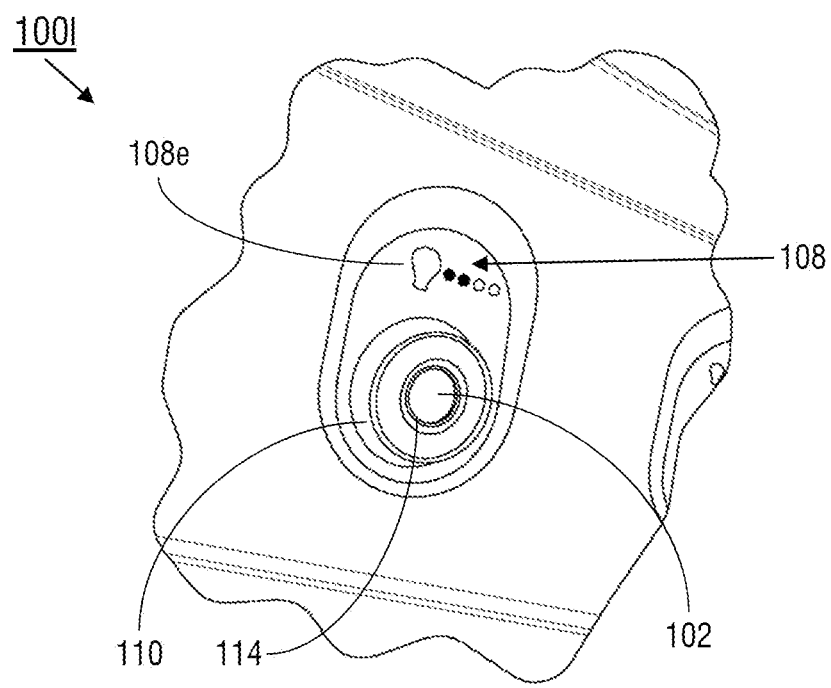

Referring to FIG. 5A, the unified PSU controller 100k may be implemented and may function similarly to the unified PSU controllers 100e-j of FIG. 4, except that the unified PSU controller 100k may display (e.g., when a passenger's hand is detected by the proximity sensor 120, FIG. 2) a control interface via the UI display 108. For example, the passenger (or occupant of the seat to which the unified PSU controller 100k is dedicated) may, via the control knob 110 and pushbutton 114: activate or deactivate the reading light 102 or adjust its intensity (108b), activate or deactivate the gasper outlet 104 and adjust its strength (108c), or call an attendant (108d). Referring also to FIG. 5B, the unified PSU controller 100l may be implemented and may function similarly to the unified PSU controller 100k of FIG. 5A, except that when the reading light control interface (108b) is selected, the unified PSU controller 100l may display an interactive control interface (108e) via which the passenger may, via the pushbutton 114 and control knob 110, deactivate or adjust the brightness of the reading light 102.

Figure 6C:
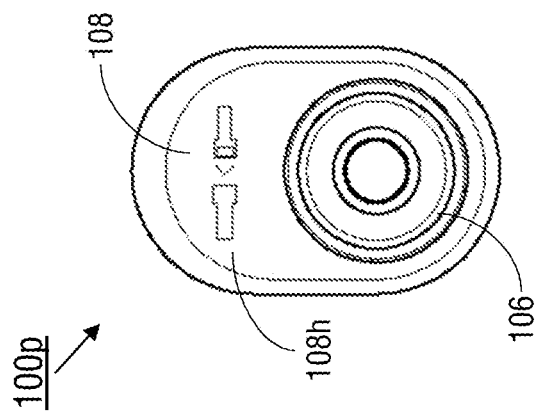
FIGS. 6A through 6C illustrate operations of the unified PSU controller of FIG. 1.
Figure 6B:
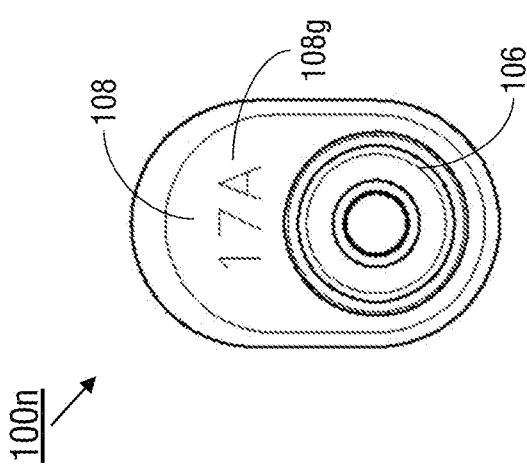
Figure 6A:
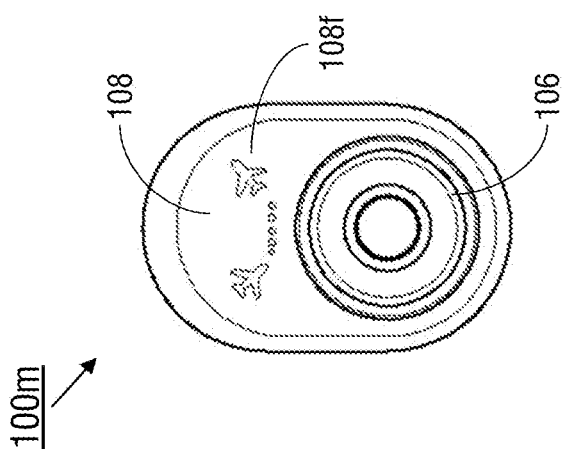

Referring to FIGS. 6A through 6C, the unified PSU controllers 100m, 100n, 100p may be implemented and may function similarly to the unified PSU controllers 100k-l of FIGS. 5A/B, except that the unified PSU controllers 100m, 100n, 100p may display other non-interactive indicators or messages initiated by the cabin crew. For example, if the notification rings (106) of a row or group of unified PSU controllers (see, e.g., 100b-d, FIG. 3) are lit to indicate that one or more occupants of the row or group may deplane first (or if the notification rings of the entire group are lit in coordination with the notification rings of other groups of unified PSU controllers, e.g., to direct passenger traffic), the UI display 108 of the unified PSU controller 100m may display a corresponding indicator (108f). Referring in particular to FIG. 6B, during boarding procedures the unified PSU controllers 100n may, as a default, display via the UI display 108 a row or seat indicator 108g corresponding to the seat to which the unified PSU controller 100n is dedicated. Referring to FIG. 6C, during taxi, takeoff and landing procedures, and during other flight segments, the UI display 108 of the unified PSU controller 100p may default to a fasten-seat-belt sign (108h) or no-smoking sign until otherwise activated (e.g., by the detection of a passenger's approaching hand by the proximity sensor 120, FIG. 2).

As will be appreciated from the above, systems and methods according to embodiments of the inventive concepts disclosed herein may combine lighting, ventilation, and call controls into a single compact unit while providing for individualized communication with passengers. Furthermore, the modular nature of the control system makes it highly adaptable for a broad variety of aircraft sizes and configurations.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

We claim:

1. A unified passenger service unit (PSU) control system, comprising:
   a plurality of controls corresponding to a seat of an aircraft and concentrically arranged within a control knob, the control knob disposed within a PSU panel of the aircraft and configured for rotation by an occupant of the seat, the control knob including at least one pushbutton, the plurality of controls controlled by one or more of the control knob and the pushbutton, the plurality of controls comprising:
   1) at least one reading light oriented toward the seat;
   2) at least one gasper outlet configured to direct air toward the seat;
   3) at least one notification ring associated with a perimeter of the control knob and communicatively coupled to at least one communication system of the aircraft, the notification ring visible from at least one cabin crew position within the aircraft and configured to illuminate upon activation by one or more of the occupant and a cabin crew of the aircraft;
   and
   at least one user interface (UI) display proximate to the control knob and communicatively coupled to the communication system, the UI display configured to display content comprising one or more of a) a preprogrammed message, b) a message sent by the cabin crew, c) a control interface associated with the plurality of controls, and d) an indicator associated with the seat.

2. The unified PSU control system of claim 1, wherein at least one of the control knob and the UI display is disposed within a recess set into the PSU panel.

3. The unified PSU control system of claim 2, wherein the recess is at least partially contoured to the control knob.

4. The unified PSU control system of claim 1, wherein the control knob is integrated into the pushbutton.

5. The unified PSU control system of claim 1, wherein the control knob includes at least one gripping portion configured to facilitate the rotation of the control knob.

6. The unified PSU control system of claim 1, wherein the control knob is positionable relative to the PSU panel.

7. The unified PSU control system of claim 1, further comprising:
at least one proximity sensor communicatively coupled to one or more of the notification ring and the UI display, the proximity sensor configured to detect the occupant;
one or more of the notification ring and the UI display configured to activate in response to the detection of the occupant.

8. The unified PSU control system of claim 1, wherein the notification ring is configured to:
illuminate in at least one first pattern upon activation by the occupant;
and
illuminate in at least one second pattern upon activation by the cabin crew.

9. The unified PSU control system of claim 1, wherein the PSU control system is a first control system and the notification ring is a first notification ring, and:
the first notification ring is configured to illuminate in coordination with at least one second notification ring of a second PSU control system upon activation by the cabin crew.

10. The unified PSU control system of claim 1, where the cabin crew position includes at least one of a cabin crew seat and a standing position within the aircraft.

11. A unified passenger service unit (PSU) control system for a group of aircraft seats, comprising:
a plurality of PSU control units, each PSU control unit corresponding to a seat of an aircraft and disposed within a PSU panel of the aircraft, each PSU control unit comprising:
a plurality of controls concentrically arranged within a control knob, the control knob configured for rotation by an occupant of the seat, the control knob including at least one pushbutton, the plurality of controls controlled by one or more of the control knob and the central button, the plurality of controls comprising:
1) at least one reading light oriented toward the seat;
2) at least one gasper outlet configured to direct air toward the seat;
3) at least one notification ring associated with a perimeter of the control knob and communicatively coupled to at least one communication system of the aircraft, the notification ring visible from at least one cabin crew position within the aircraft and configured to illuminate upon activation by one or more of the occupant and a cabin crew of the aircraft;
and
at least one user interface (UI) display proximate to the control knob and communicatively coupled to the communication system, the UI display configured to display content comprising one or more of (a) a preprogrammed message, (b) a message sent by the cabin crew, (c) a control interface associated with the plurality of controls, and (d) an indicator associated with the seat.

12. The unified PSU control system of claim 11, wherein each PSU control unit is disposed within a recess set into the PSU panel.

13. The unified PSU control system of claim 12, wherein the recess is at least partially contoured to the control knob.

14. The unified PSU control system of claim 11, wherein the control knob is integrated into the pushbutton.

15. The unified PSU control system of claim 11, wherein the control knob includes at least one gripping portion configured to facilitate the rotation of the control knob.

16. The unified PSU control system of claim 11, wherein each control knob is independently positionable relative to the PSU panel.

17. The unified PSU control system of claim 11, wherein each PSU control unit further comprises:
at least one proximity sensor communicatively coupled to one or more of the notification ring and the UI display, the proximity sensor configured to detect the occupant;
one or more of the notification ring and the UI display configured to activate in response to the detection of the occupant.

18. The unified PSU control system of claim 11, wherein each notification ring is configured to:
illuminate in at least one first pattern upon activation by the occupant;
and
illuminate in at least one second pattern upon activation by the cabin crew.

19. The unified PSU control system of claim 11, wherein the plurality of notification rings are configured to illuminate in coordination with each other upon activation by the cabin crew.

20. The unified PSU control system of claim 19, wherein the PSU control system is a first PSU control system and the plurality of notification rings is a first plurality of notification rings, and:
the first plurality of notification rings are configured to illuminate in coordination with at least one second plurality of notification rings, the second plurality of notification rings associated with a second PSU control system associated with the aircraft.

* * * * *